United States Patent [19]

Cooper

[11] 4,296,729
[45] Oct. 27, 1981

[54] SOLAR HOT WATER HEATING SYSTEM
[75] Inventor: George H. Cooper, Bridgton, Me.
[73] Assignee: Suntime, Inc., Bridgton, Me.
[21] Appl. No.: 118,486
[22] Filed: Feb. 4, 1980
[51] Int. Cl.³ .......................... F24J 3/02; F24D 11/00
[52] U.S. Cl. .................... 126/421; 126/433; 126/435; 126/437; 165/18
[58] Field of Search .............. 126/427, 437, 421, 422, 126/434, 435, 433, 400; 165/18, 39

[56] References Cited
U.S. PATENT DOCUMENTS

| | | | |
|---|---|---|---|
| 3,799,145 | 3/1974 | Butterfield | 126/427 |
| 4,044,948 | 8/1977 | Bottum | 126/421 |
| 4,044,949 | 8/1977 | Morawetz et al. | 126/437 |
| 4,120,289 | 10/1978 | Bottum | 126/437 |
| 4,130,110 | 12/1978 | Bottum | 126/421 |
| 4,138,996 | 2/1979 | Cartland | 126/400 |
| 4,165,732 | 8/1979 | Morin | 126/437 |
| 4,191,172 | 3/1980 | Walch et al. | 126/421 |

Primary Examiner—Daniel J. O'Connor
Attorney, Agent, or Firm—W. R. Hulbert

[57] ABSTRACT

A solar hot water heating system, utilizing preferably a gas-liquid, phase change medium in the collector, employs one heating and storage tank above the collector and a preheating and storage tank below the first tank and preferably also below the collector. A cold water source feeds the inlet of the preheating tank which has its outlet connected to the inlet of the heating tank. The hot water outlet of the heating tank not only supplies heated water where needed but has a connection for recirculating surplus hot water to the inlet of the preheating tank by means of a pump which is activated and deactivated by a switch sensitive to the temperature of the medium.

8 Claims, 2 Drawing Figures

SOLAR HOT WATER HEATING SYSTEM

BACKGROUND OF THE INVENTION

It is known to provide a solar hot water heating system employing a gas-liquid, phase change medium such as the refrigerant commonly used in refrigerators, Freon being one of them. If the water heating tank or condensor is located physically above the outlet of the solar collector the refrigerant will circulate without need for a pump. It rises from the heat collector in its vapor phase, passes through the condensor where it is allowed to condense and then falls in liquid phase by gravity back to the collector inlet. In such a system the volume of hot water available is limited by the size of the heating tank and the collector must be turned off when all the water is hot. Furthermore, the cold water fed into the heating tank will be untempered and hence, when there is demand for hot water from the heating tank, fresh water at its coldest temperature immediately enters the heating tank and cools the water in it.

It is thus apparent that on a bright, sunny day the collector may have considerably excess capacity which cannot be used but that, when the system is activated, it must heat the cold water from the temperature of the water main or well, thus placing a maximum load on the system whenever operating.

It is also known to provide a heat exchanger of negligible hot water storage capacity at a location above the solar collector and an insulated hot water storage tank at a location below the collector, presumably the basement of a house. See U.S. Pat. No. 4,120,289. Such an arrangement requires that all the water to be heated be pumped continuously when the system is operating so as to build up a reservoir of heated water in the remote insulated tank, with attendant waste of energy and heat loss.

SUMMARY OF THE INVENTION

It is accordingly an object of the invention to provide an improved hot water heating system employing a heat collector and heat exchanger in the form of a water heating tank utilizing a thermosyphon medium wherein surplus hot water from the heating tank may be used to temper water in a preheating tank which feeds the heating tank.

A further object is to provide such a system wherein the efficiency of operation may be selected by the operator, maximum water temperature yielding the least efficiency and lower temperatures yielding much improved efficiency.

According to the invention, there is provided in a hot water heating system, adapted to receive cold water from a pressurized source and to supply hot water to a hot water system, which hot water heating system is of the type employing a thermosyphon medium circulated through a heat collector exposed to a source of heat, then through a heat exchanger where it gives up its heat to the water and thence through a return line back to the collector and wherein the heat exchanger is in a water heating and storage tank located above the collector and which has a lower inlet and an upper outlet, the following improvement.

A preheating and storage tank is located below the heating tank, preferably also below the collector, and has a lower inlet for connection to a pressurized source of cold water and an upper outlet connected to the inlet of the heating tank. Means are provided connecting the outlet of the heating tank to the hot water system and also to the inlet of the preheating tank. A circulating pump is associated with the aforesaid mentioned connecting means for pumping hot water from the heating tank into the preheating tank. Means are also provided, sensitive to the temperature of the medium, for activating and deactivating the pump, whereby surplus hot water may be withdrawn from the heating tank and fed into the preheating tank to preheat the water therein prior to its being fed into the heating tank.

Further features of the invention include one or more of the following: a liquid-gas, phase change medium comprising the thermosyphon medium; the heat collector comprising a solar collector adapted to be exposed to the sun's rays wherein the medium is evaporated and then passed through the heat exchanger to be condensed and returned by gravity as a liquid to the base of the collector; the preheating and storage tank being larger than the heating and storage tank and located below both the last named tank and the heat collector; the activating and deactivating means comprising a pressure or temperature sensitive switch located in the return line for the medium; and a check valve located between the pump and the hot water system to prevent introduction of cold water into the hot water system.

Further objects, advantages and features of the invention will become apparent from the following detailed description of a preferred embodiment, taken in conjunction with the accompanying drawings.

DETAILED DESCRIPTION OF PREFERRED EMBODIMENT

Figure 1:
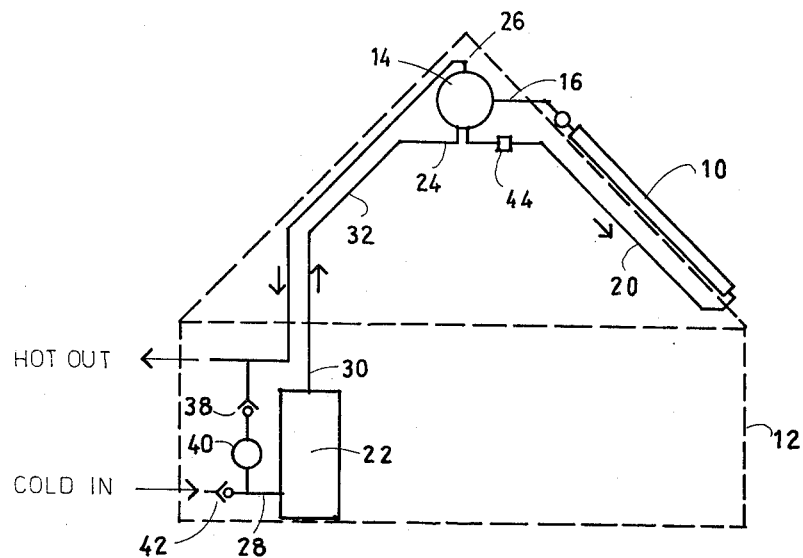
FIG. 1 is a schematic representation of a typical solar hot water heating system employing the invention installed in a house.
Figure 2:
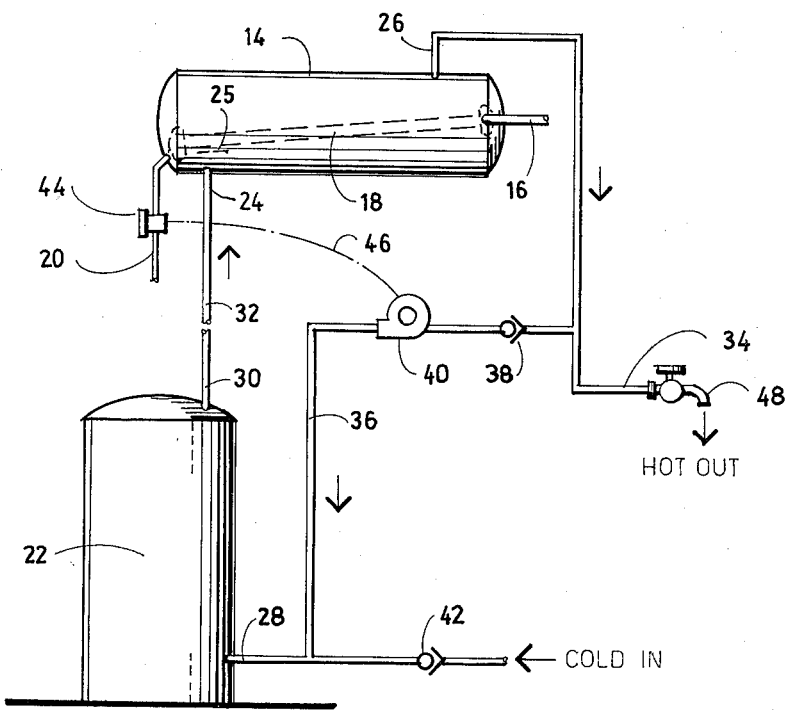
FIG. 2 is a detailed schematic representation of the system itself, showing the inter-relationship of the components thereof.

Referring to FIG. 1, the general arrangement of the novel system is apparent. A solar collector 10 is mounted on the roof of a house 12. It is preferably of the type which uses a liquid-gas, phase change medium to collect and transfer the heat to the water to be heated. A suitable collector is available on the market and is sold by Sunworks of New Haven, Connecticut, under the trademark "Solector, drain down." A forty-gallon hot water heating tank 14 is mounted in the rafters of the dwelling at a higher elevation than the collector 10. The phase change medium is heated by the sun in the collector and turns to vapor. The vapor rises through tubing 16 and passes through heat exchanger tubing 18 within tank 14 which contains the water to be heated. The energy is given up to the water and the medium condenses to liquid and falls by gravity through line 20 and returns to the bottom of the collector for re-use.

According to the invention there is mounted at a convenient location below the tank 14, and preferably also below the collector 10, in this case in the basement of the house 12, a second and larger tank 22. This tank is preferably twice the size of tank 14, i.e., eighty gallons, for reasons which will appear below.

The heating tank 14 is provided with a water inlet 24 located at or near the bottom of the tank and, desirably, a deflector 25 within the tank directly above such inlet to deflect incoming cool water from passing through the tubing 18, and upsetting the stratification of the heated water. The tank 14 has a hot water outlet 26 at or near the top of the tank. The other tank 22, which is a preheating tank for the system, is also provided with a lower cold water inlet 28 for connection to a water main and an upper outlet 30 which is connected by line 32 to the inlet 24 of tank 14.

The hot water system of the house is indicated by the numeral 34 and it is connected, as indicated, directly to outlet 26. Another line 36 is connected from the system 34 to the inlet 28 of preheater tank 22. In the line 36 there is inserted first a check valve 38, to prevent cold water from entering the hot water system, and a small capacity circulating pump 40. Another check valve 42 in the cold water entrance line safeguards the water main from back-up from the house system.

At a convenient point in the circulating heat collecting medium cycle there is inserted a temperature or pressure sensitive switch 44. Preferably the switch is located in the return line 20 which is within the house and readily accessible for adjustment and/or repair. By suitable electrical connection 46 the switch 44 can control pump 40. The switch is set to activate the pump when the temperature of the circulating medium in the solar collector reaches a predetermined value and to deactivate the pump when the temperature falls below a preselected value.

In operation, the solar collector 10, when exposed to the sun, causes heat to be collected in the medium and transferred to water in the tank 14 by heat exchange through tubing 18 which is surrounded by the water to be heated. If there is no demand for hot water (symbolized by opening or closing a faucet 48), the water in the forty-gallon tank 14 will soon be heated to its desired temperature. As soon as the water reaches such temperature the temperature of the refrigerant in return line 20 will correspondingly increase thereby activating the switch 44. In turn, the circulating pump 40 will be actuated and will commence pumping hot water from the house system 34, in effect from the tank 14, into the inlet of the preheating tank 22, thereby tempering the water therein so that water supplied from it to the heating tank 14 will arrive at a higher temperature than if it came straight from the water main or other pressurized source of cold water.

In the event that the house system calls for hot water the switch 44 will open as soon as the temperature falls in the heating tank 14, thus the full capacity of the tank 22 is at the disposal of the user. Similarly, if the solar panel 10 ceases to receive heat from the sun's rays, the temperature of the returning refrigerant will correspondingly drop and the pump 40 will be deactivated by the switch 44.

It will be noted that the division of the water heating and storage function of the system into two tanks is unique and has rather unexpected advantages. First, with plenty of sunshine and little demand for hot water, the system will effectively heat a volume of water equal to the combined volume of the two tanks. In this respect the result is the same as though tank 14 were of much larger volume and, thus, a maximum quantity of hot water is stored and available for use. However, if there is increased demand for hot water or if available sunshine is reduced, the recirculation of hot water from the outlet 26 of tank 14 to the preheating tank 22 is instantly cut off. At this point the same solar collector is now heating only a forty-gallon tank, tank 14, rather than a one hundred twenty-gallon volume, the combined capacity of the two tanks. Consequently, it will heat the water at maximum efficiency and will bring the temperature of the forty gallons more rapidly up to a substantially higher temperature than would be reached if it were striving to heat a much larger volume.

The switch 44 may be set to operate at any predetermined desired temperature (which is a function of the pressure in the system). If it is adjusted to a relatively cool setting, the system will produce warm water in abundance, but not very much hot water under usual conditions. If it is set to a "normal" setting, i.e., about 125° F., plenty of hot water will be available and substantial back-up of at least well-tempered water will be supplied by the preheating tank 22. If the switch is set to operate at 150° F., very hot water will be available but efficiency and the back-up storage capacity of the preheating tank will be sacrificed.

While the novel system of the invention has been described in connection with a solar heat collector of the type employing a liquid-gas, phase change medium, it is clear that the system is applicable to any thermosyphon medium wherein the medium gives up its collected energy to the water to be heated through a heat exchanger. The liquid-gas, phase change medium is presently preferred.

The system consumes little energy in operation, unlike systems which require pumping of all the water to be heated. Thus the solar collector part of the system is operated solely by the collected energy from the sun and gravity to return the condensed liquid medium to the bottom of the collecting solar panel(s). The water to be heated is propelled through the system, whenever a tap is opened in the house, by the pressure provided by the cold water supply. It need not be pumped at all, except, of course, in installations where water must be pumped from a well because not supplied by the city. The recirculation from the outlet side of the heating tank 14 to the inlet of the preheating tank 22 can be, and preferably is, accomplished by a very small capacity pump, requiring very little electrical energy. This is so because there is no need to extract hot water from the hot water side of the system any faster than it can be heated in the tank 14. A more powerful pump would simply be turned on and off more frequently than a smaller one by the switch 44, consequently such a pump would be a waste of both initial investment and operating expense.

In one installation typical components and pressure values for satisfactory performance are as follows. A Grundfos, UM 25-18-SU, 1/35th H.P. pump (a product of Grandfos Pump Corp. of Clovis, Calif.) was employed for pump 40. This pump will pump 14 G.P.M. maximum against no head. In the system it pumps of the order of 9 G.P.M. which is more than adequate for the combined 40 gallon and 80 gallon tanks. A standard well pump control switch made by Square D, FSG2, Form M4P, (a product of Square D. Company of Palatine, Ill.) utilizing its low pressure override mode, was found suitable for pressure switch 44. This switch was set to actuate the pump when the pressure in the refrigerant system (line 20) reached 42 P.S.I. and to turn the pump off when the pressure dropped to 40 P.S.I. An alternative switch may be found to work even better, namely, Texas Instruments, Model 20PS002EA00-55E040E, (a product of Texas Instruments, Inc. of Versailles, KY) which would be set to turn on at 55 P.S.I. and off when pressure drops to 40 P.S.I.

While there has been herein disclosed a preferred embodiment of the invention it will be clear that the same is susceptible of modification and change by those skilled in the art without departing from its proper scope. Accordingly, it is intended that the scope of the invention be limited only by the interpretation to be accorded the appended claims.

I claim:

1. In a hot water heating system adapted to receive cold water from a pressurized source and to supply hot water to a hot water system, which hot water heating system is of the type employing a thermosyphon medium circulated through a heat collector exposed to a source of heat, then through a heat exchanger where it gives up its heat to the water and thence through a return line back to the collector, and wherein the heat exchanger is in a water and storage tank located above the collector and having a lower inlet and an upper outlet the latter being arranged to discharge hot water into said hot water system, the improvement comprising

- a preheating tank located below said heating tank and having a lower inlet for connection to a pressurized source of cold water and an upper outlet connected to the inlet of said heating tank;
- a conduit connecting said upper outlet of said heating tank to said lower inlet of said preheating tank;
- a circulating pump in said conduit for pumping hot water from said heating tank into said preheating tank;
- a check valve in said conduit to prevent reverse flow of cold water from said pressurized source through said conduit to said hot water system; and
- means sensitive to a condition of said medium for activating and deactivating said pump, whereby surplus hot water may be withdrawn from the heating tank and fed into the preheating tank to preheat the water therein prior to its being fed into the heating tank.

2. The combination of claim 1 wherein said thermosyphon medium comprises a liquid-gas, phase change medium and said heat collector comprises a solar collector adapted to be exposed to the sun's rays wherein said medium is evaporated and then passed through said heat exchanger to be condensed and returned by gravity as a liquid to the base of said collector.

3. The combination of claim 2 wherein said preheating tank is located below both said heating tank and said heat collector.

4. The combination of claim 2 wherein said activating and deactivating means comprises a pressure sensitive switch in said return line for said medium.

5. The combination of claim 2 wherein said activating and deactivating means comprises a temperature sensitive switch in said return line for said medium.

6. The combination of claim 3 wherein said preheating tank is of greater capacity than said heating tank whereby when said pump is deactivated the volume of water heated is limited to the capacity of the primary tank.

7. A solar hot water heating system comprising
- a solar heat collector
- a primary water heating and storage tank located at a level above said collector
- a heat exchanger within said tank
- means for circulating a heat absorbing medium through said collector and heat exchanger so that it receives heat in the collector and releases its heat in the heat exchanger and returns by gravity to the collector
- a secondary water preheating and storage tank located at a level below said collector and said primary tank
  - the inlet of said secondary tank being adapted to be connected to a source of cold water under pressure and having its outlet connected to the inlet of said primary tank
- means for recirculating hot water from said primary tank to said secondary tank,
  - said recirculating means comprising a conduit connecting the hot water outlet of said primary tank to the inlet of said secondary tank, a circulating pump in said conduit and a check valve in said conduit to prevent reverse flow of cold water therethrough, and
- control means responsive to a condition in said primary tank for activating and deactivating said pump so that only surplus hot water from said primary tank will be returned to said secondary tank.

8. The combination as claimed in claim 7 wherein said secondary tank is of larger volume than said primary tank whereby when said recirculating means is deactivated, the volume of water being heated is limited to the capacity of the primary tank.

* * * * *

UNITED STATES PATENT AND TRADEMARK OFFICE
CERTIFICATE OF CORRECTION

PATENT NO. : 4,296,729
DATED : October 27, 1981
INVENTOR(S) : George H. Cooper

It is certified that error appears in the above-identified patent and that said Letters Patent are hereby corrected as shown below:

In claim 1, column 5, line 18, after "water" insert --heating--.

In claim 7, column 6, line 26, after "below" insert --both--.

Signed and Sealed this

Sixteenth Day of February 1982

[SEAL]

Attest:

Attesting Officer

GERALD J. MOSSINGHOFF

Commissioner of Patents and Trademarks